(12) United States Patent
Nguyen

(10) Patent No.: US 11,673,510 B1
(45) Date of Patent: Jun. 13, 2023

(54) PORTABLE CARGO CARRYING ASSEMBLY

(71) Applicant: Tan Nguyen, Salisbury, MD (US)

(72) Inventor: Tan Nguyen, Salisbury, MD (US)

( * ) Notice: Subject to any disclaimer, the term of this patent is extended or adjusted under 35 U.S.C. 154(b) by 0 days.

(21) Appl. No.: 17/946,143

(22) Filed: Sep. 16, 2022

(51) Int. Cl.
*B60R 9/06* (2006.01)

(52) U.S. Cl.
CPC ..................... *B60R 9/06* (2013.01)

(58) Field of Classification Search
CPC .......................................................... B60R 9/06
USPC .................................................. 414/462–466
See application file for complete search history.

(56) References Cited

U.S. PATENT DOCUMENTS

| 6,152,351 | A | 11/2000 | LeMay | |
|---|---|---|---|---|
| 7,156,273 | B2 * | 1/2007 | Morris | B60R 9/06 108/14 |
| 3,061,572 | A1 | 11/2011 | Myrex | |
| 9,718,411 | B2 * | 8/2017 | Field, Jr. | B60R 3/007 |
| 2004/0080149 | A1 * | 4/2004 | Martin | B60R 9/06 280/769 |
| 2005/0092799 | A1 | 5/2005 | Morris | |
| 2009/0056592 | A1 * | 3/2009 | Threet | B60R 9/06 108/11 |
| 2009/0140024 | A1 * | 6/2009 | McLemore | B60R 9/06 224/495 |
| 2011/0278336 | A1 * | 11/2011 | Landrum | B60R 9/06 224/509 |
| 2022/0144352 | A1 * | 5/2022 | Nelson | A47B 3/10 |

* cited by examiner

*Primary Examiner* — Lynn E Schwenning

(57) ABSTRACT

A portable cargo carrying assembly includes a cargo carrier that has a hitch engagement such that the hitch engagement is attachable to a hitch receiver of a vehicle to transport cargo. The cargo carrier has a pair of handles each is integrated into the cargo carrier thereby facilitating the cargo carrier to be carried by a user. A plurality of support legs is each pivotally attached to the cargo carrier. Each of the support legs is positionable in a stored position when the cargo carrier is attached to the vehicle. Each of the support legs is positionable in a deployed position when the cargo carrier is detached from the vehicle thereby facilitating the support legs to support the cargo carrier above a support surface such that the cargo carrier defines a table.

7 Claims, 6 Drawing Sheets

PORTABLE CARGO CARRYING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cargo carrying device and more particularly pertains to a new cargo carrying device for carrying cargo on a vehicle and being convertible into a table. The device includes a cargo carrier which has a hitch engagement that can releasably engage a hitch receiver of a vehicle thereby facilitating the cargo carrier to transport cargo. The device includes a plurality of legs that are each hingedly coupled to the cargo carrier. The legs are positionable in a stored position when the cargo carrier is attached to the hitch receiver. Conversely, the legs are positionable in a deployed position such that the cargo carrier defines a table.

(2) Description of Related Art Including Information Disclosed Under 37 CFR 1.97 and 1.98

The prior art relates to cargo carrying devices including a cargo carrier that has a telescopic hitch engagement for spacing the cargo carrier from a hitch receiver of a vehicle. The prior art discloses a cargo trailer that has retractable legs and a plurality of wheels each disposed on a respective leg for towing the cargo trailer. The retractable legs can be retracted such that the cargo trailer can be supported on a hitch receiver of a vehicle in the convention of a cargo carrier. The prior art discloses a hand truck that includes a hitch engagement for attaching the hand truck to a hitch receiver of a vehicle such that the hand truck defines a cargo carrier. The prior art discloses a modular cargo box that includes legs which are stored on a lid of the cargo box and which are attachable to a removable panel of the cargo box to define a table. The prior art discloses a cargo carrier which has a pivoting element thereby facilitating the cargo carrier to be pivoted on a hitch receiver.

BRIEF SUMMARY OF THE INVENTION

An embodiment of the disclosure meets the needs presented above by generally comprising a cargo carrier that has a hitch engagement such that the hitch engagement is attachable to a hitch receiver of a vehicle to transport cargo. The cargo carrier has a pair of handles each is integrated into the cargo carrier thereby facilitating the cargo carrier to be carried by a user. A plurality of support legs is each pivotally attached to the cargo carrier. Each of the support legs is positionable in a stored position when the cargo carrier is attached to the vehicle. Each of the support legs is positionable in a deployed position when the cargo carrier is detached from the vehicle thereby facilitating the support legs to support the cargo carrier above a support surface such that the cargo carrier defines a table.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
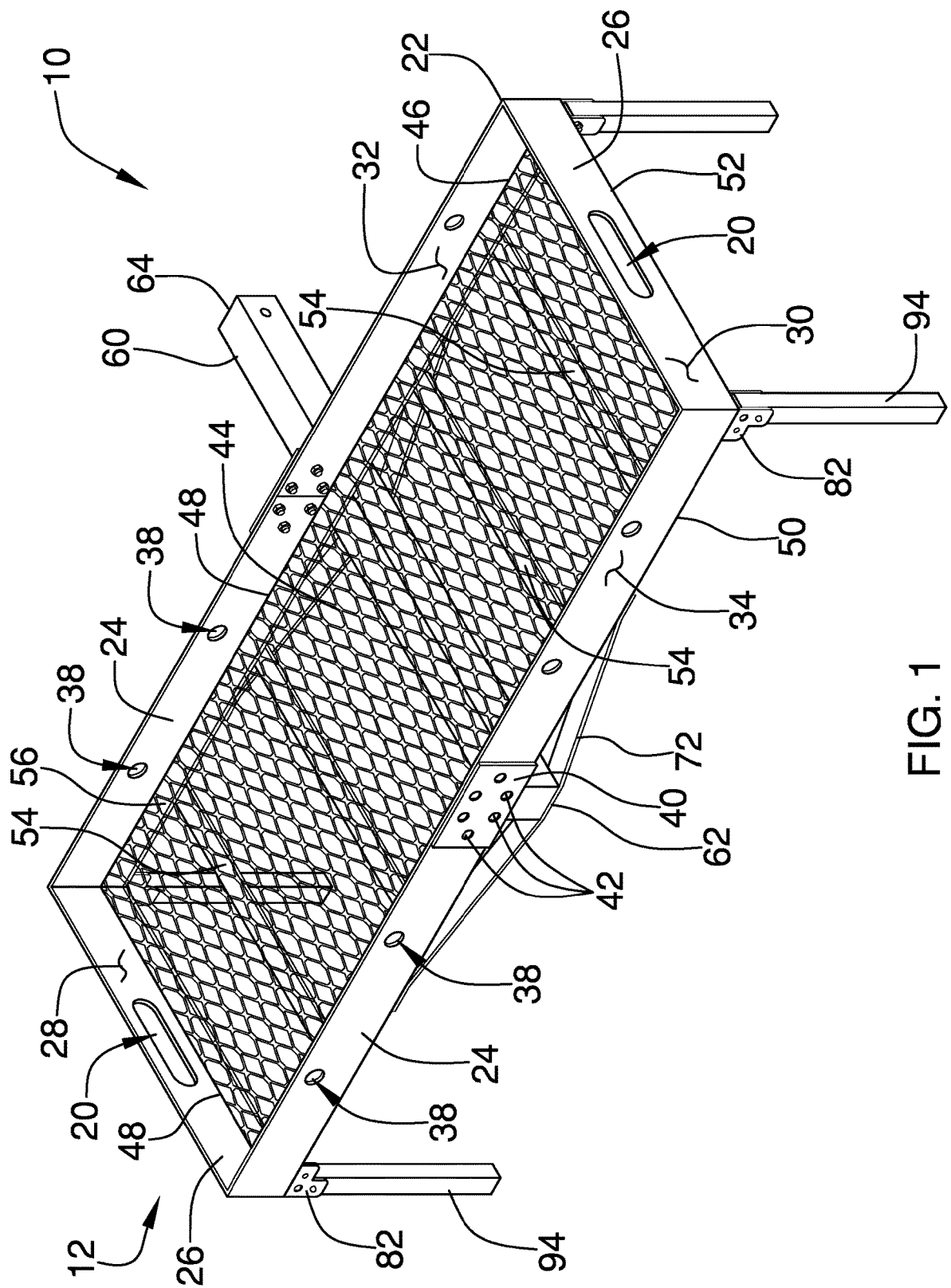
FIG. 1 is a top perspective view of a portable cargo carrying assembly according to an embodiment of the disclosure showing a plurality of legs in a deployed position.
Figure 2:
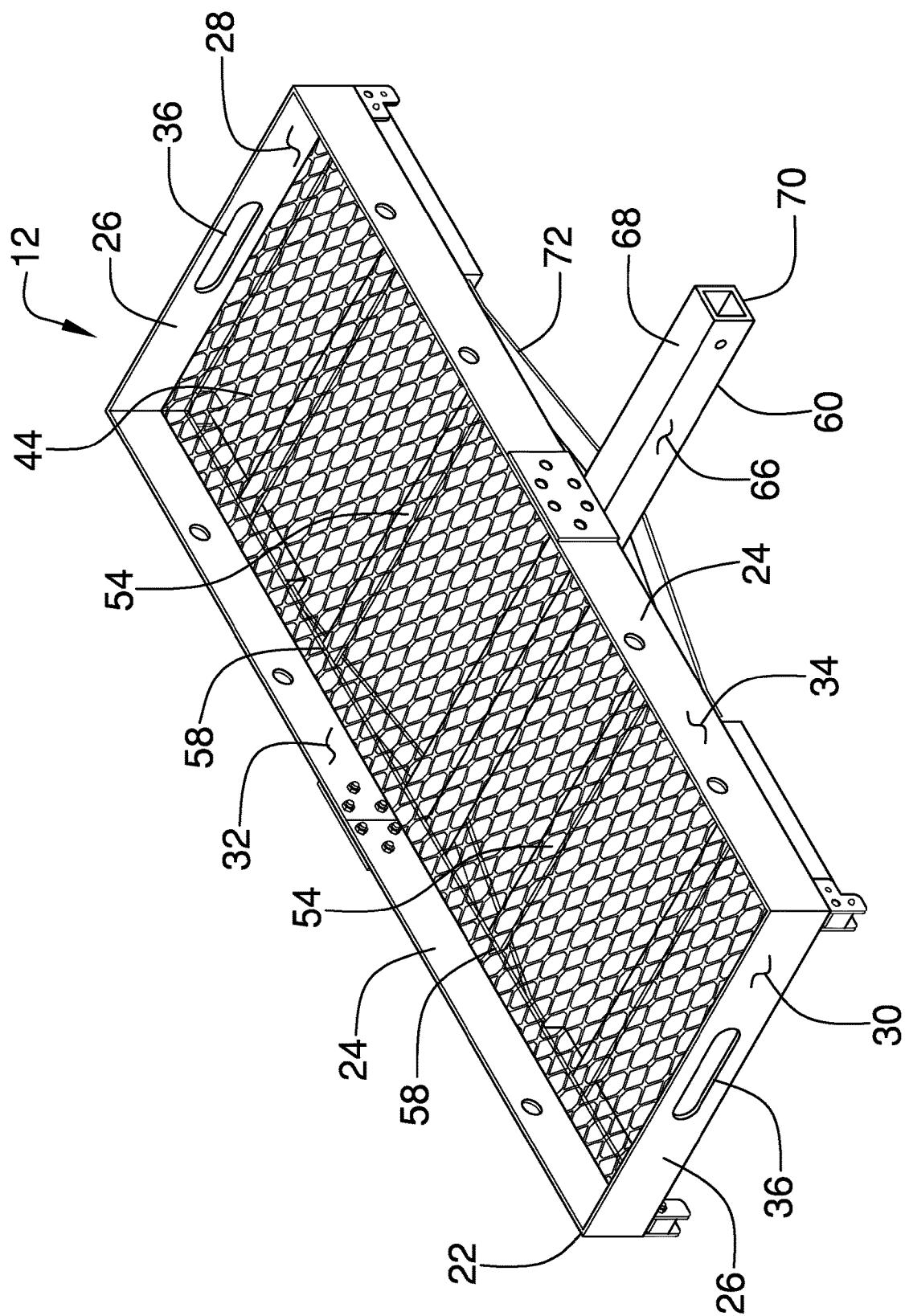
FIG. 2 is a top perspective view of an embodiment of the disclosure showing a plurality of legs in a stored position.
Figure 3:
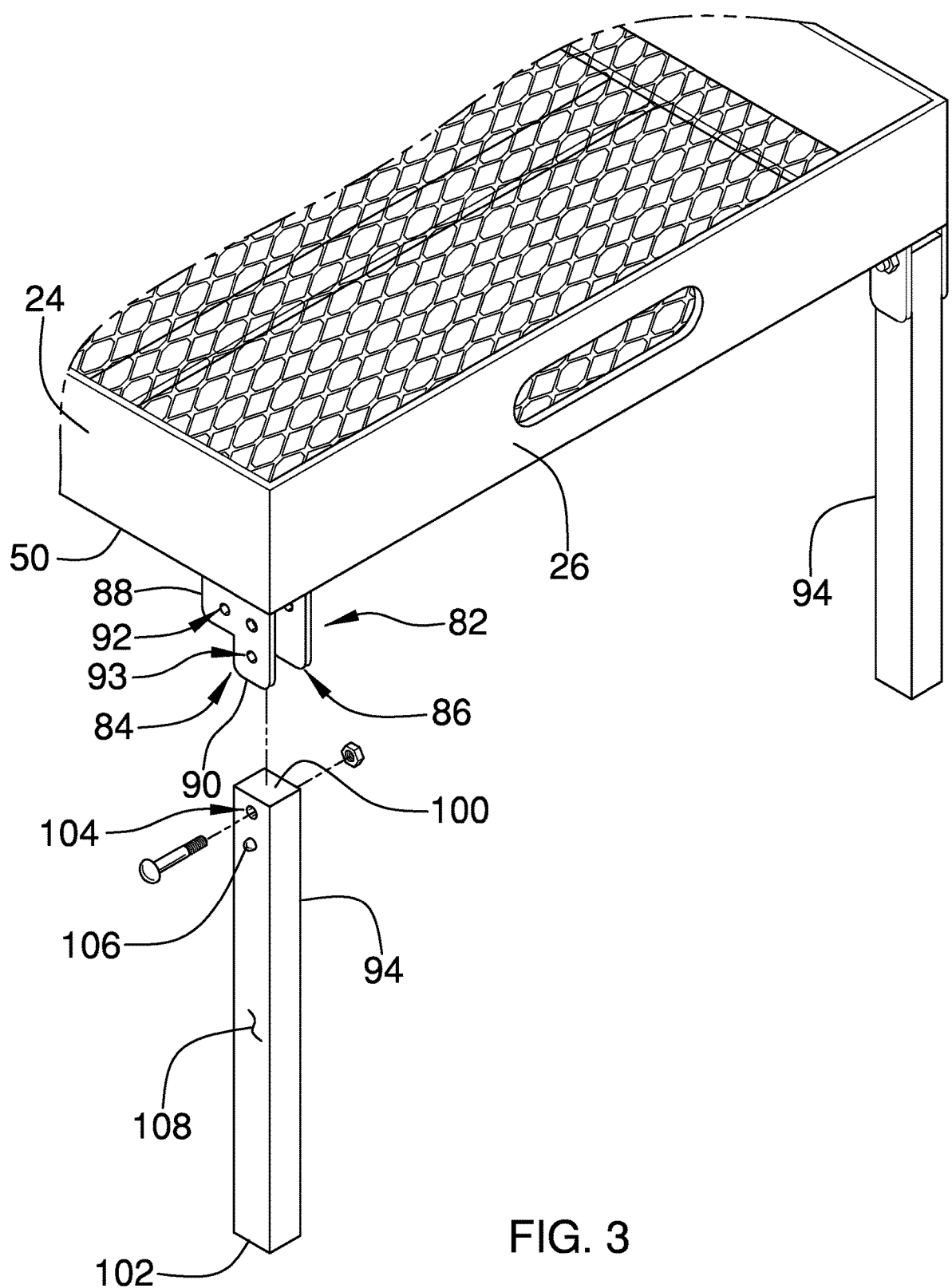
FIG. 3 is an exploded perspective view of an embodiment of the disclosure showing a leg and a hinge.
Figure 4:
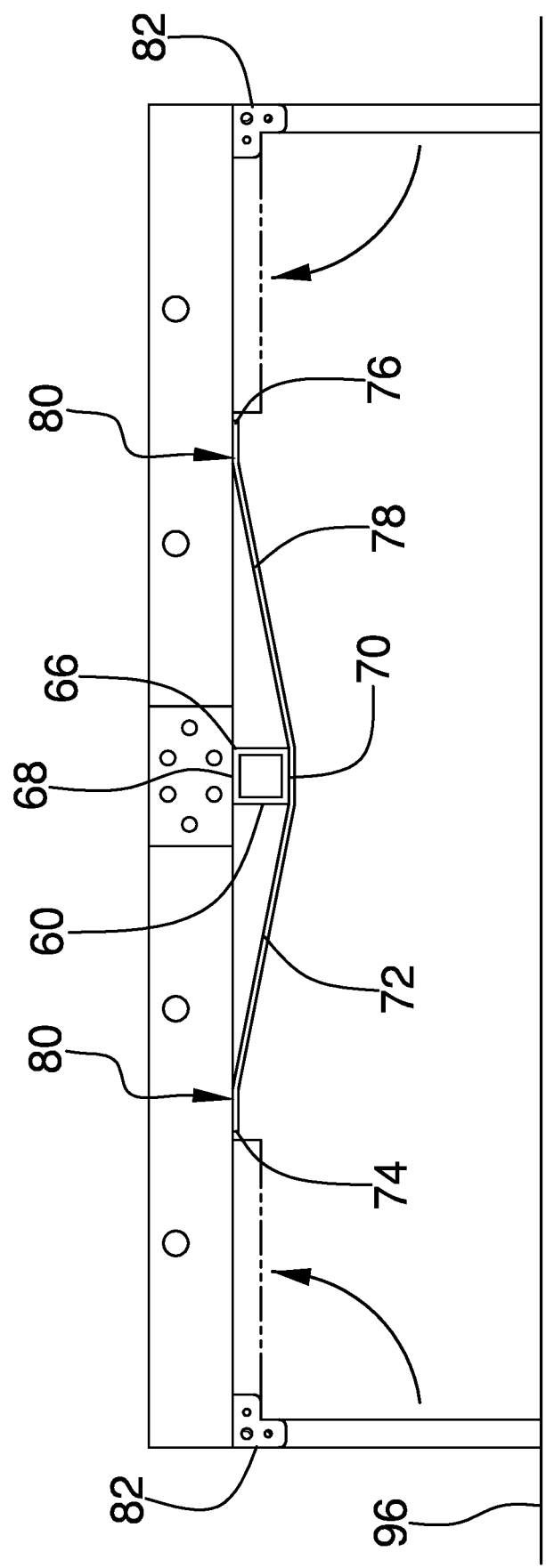
FIG. 4 is a front view of an embodiment of the disclosure showing a plurality of legs in a deployed position.
Figure 5:
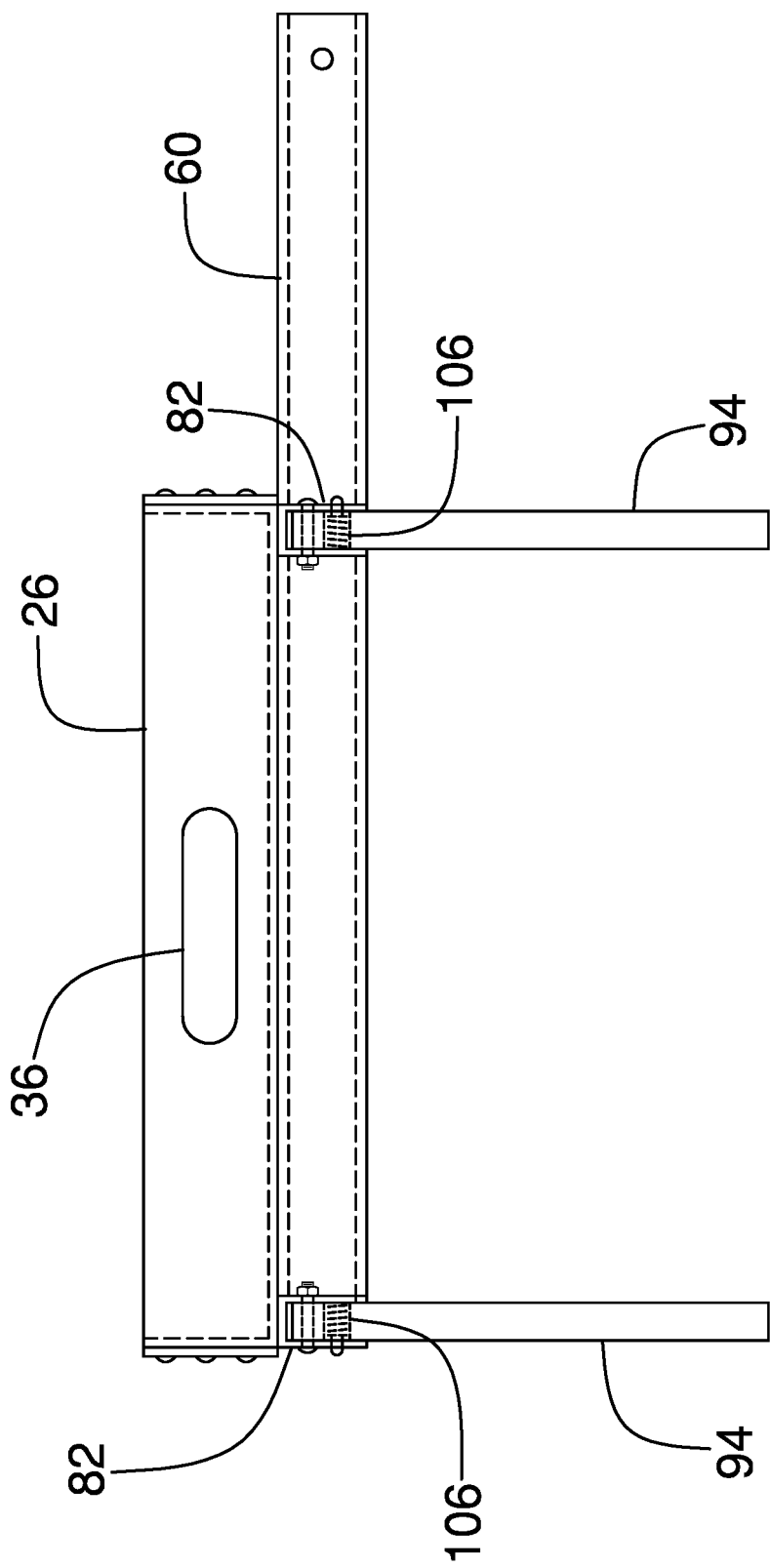
FIG. 5 is a right side phantom view of an embodiment of the disclosure.
Figure 6:
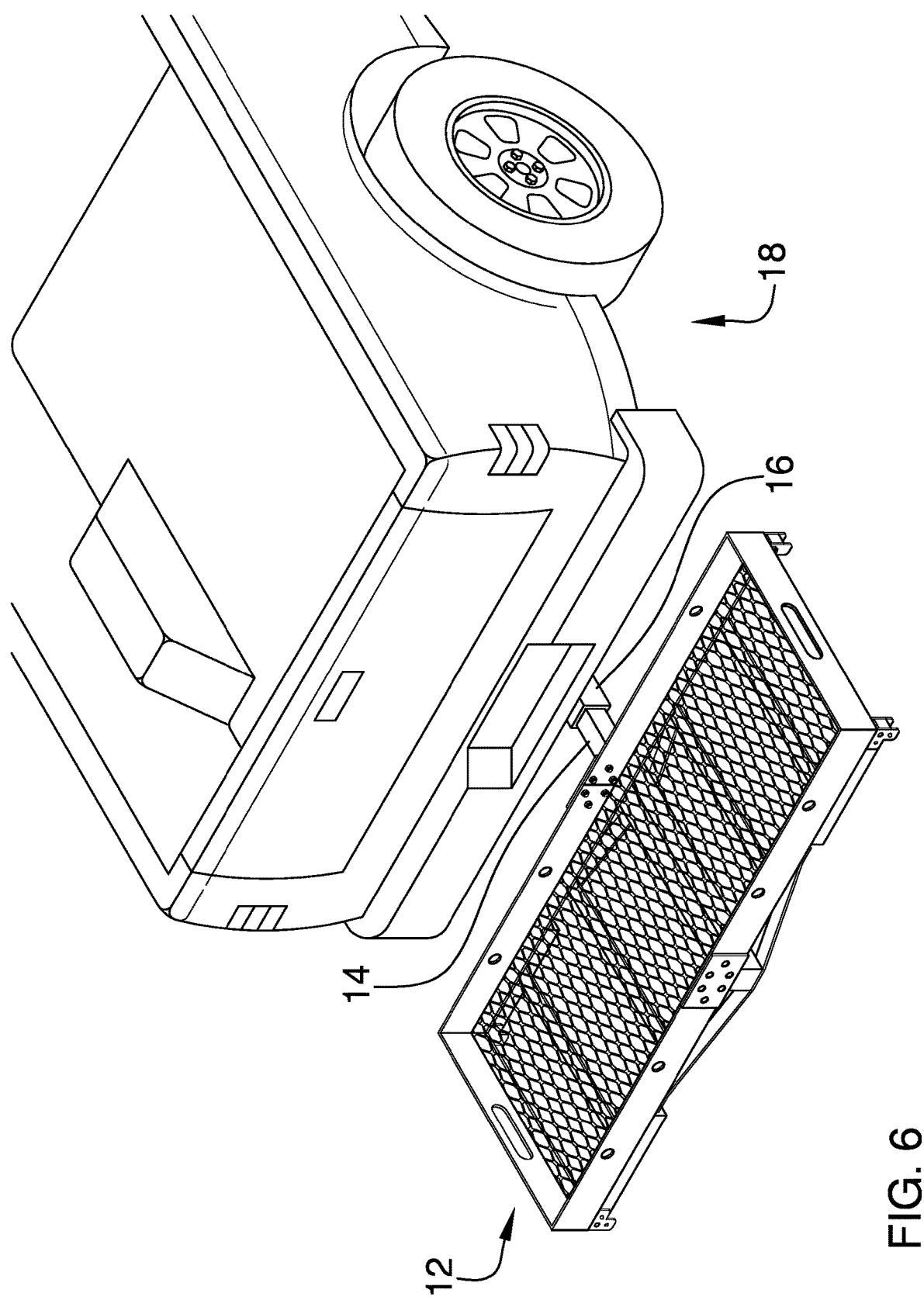
FIG. 6 is a perspective in-use view of an embodiment of the disclosure.

With reference now to the drawings, and in particular to FIGS. 1 through 6 thereof, a new cargo carrying device embodying the principles and concepts of an embodiment of the disclosure and generally designated by the reference numeral 10 will be described.

As best illustrated in FIGS. 1 through 6, the portable cargo carrying assembly 10 generally comprises a cargo carrier 12 that has a hitch engagement 14 such that the hitch engagement 14 is attachable to a hitch receiver 16 of a vehicle 18 to transport cargo. The vehicle 18 may be a pickup truck or other type of motorized vehicle that has a hitch receiver. The cargo carrier 12 has a pair of handles 20 that is each integrated into the cargo carrier 12 thereby facilitating the cargo carrier 12 to be carried by a user. The cargo carrier 12 comprises a frame 22 has a pair of first members 24 each extending between a pair of second members 26. The first members 24 are oriented parallel with each other and are perpendicularly oriented with each of the second members 26 such that the frame 22 defines a rectangle.

Each of the second members 26 has a first surface 28 and a second surface 30 and each of the first members 24 has a primary surface 32 and a secondary surface 34. Each of the second members 26 has a slot 36 extending through the first surface 28 and the second surface 30 such that the slot 36 in each of the second members 26 defines a respective one of the handles 20. The slot 36 in each of the second members 26 is centrally positioned between the pair of first members 24. The slot 36 in each of the second members 26 is elongated along an axis extending between the pair of first members 24. Each of the first members 24 has a plurality of holes 38 extending through the primary surface 32 and the secondary surface 34 of a respective one of the first members 24. The holes 38 are spaced apart from each other and are distributed along the respective first member 24. As is most clearly shown in FIGS. 1 and 2, each of the first members 24 may be split in half and each half of the first members 24 may be fastened together by a panel 40 and a plurality of bolts 42 extending through the panel 40 and engaging each half of the first members 24.

The cargo carrier 12 includes a mesh panel 44 that has a perimeter edge 46 and the perimeter edge 46 has a plurality of intersecting sides 48 such that the mesh panel 44 has a rectangular shape. Each of the intersecting sides 48 is attached to the primary surface 32 of a respective one of the first members 24 and the first surface 28 of a respective one of the second members 26 such that the mesh panel 44 defines a floor of the cargo carrier 12. The mesh panel 44 is spaced upwardly from a bottom edge 50 of each of the first members 24 and a bottom edge 52 of each of the second members 26. Additionally, the mesh panel 44 is comprised of a rigid material, including but not being limited to steel or aluminum, such that the mesh panel 44 has a load bearing capacity of at least 225.0 kg. The cargo carrier 12 includes a plurality of cross members 54 that each has a first end 56 and a second end 58. Each of the first end 56 and the second end 58 of each of the cross members 54 is coupled to the primary surface 32 of a respective one of the first members 24 thereby inhibiting the first members 24 from bending away from each other. Each of the cross members 54 is positioned beneath the mesh panel 44 and the cross members 54 are spaced apart from each other and are distributed along the pair of first members 24.

The cargo carrier 12 includes a hitch member 60 that has a first end 62, a second end 64 and an outer surface 66 extending between the first end 62 and the second end 64 of the hitch member 60, and the outer surface 66 has a top side 68 and a bottom side 70. The hitch member 60 is attached to the frame 22 such that the top side 68 abuts the bottom edge 50 of each of the first members 24 of the frame 22. The hitch member 60 is oriented to extend along an axis is oriented parallel to the pair of second members 26 of the frame 22 and the hitch member 60 is centrally positioned between the pair of second members 26. The first end 62 of the hitch member 60 is aligned with a respective one of the first members 24 and the hitch member 60 extends outwardly beyond a respective one of the first members 24 such that the second end 58 of the hitch member 60 is insertable into the hitch receiver 16 of the vehicle 18 having the mesh panel 44 lying on a horizontal plane.

The cargo carrier 12 includes a pair of supports 72 that each of the supports 72 has a primary end 74, a secondary end 76 and an upper surface 78 extending between the primary end 74 and the secondary end 76. The upper surface 78 of each of the supports 72 abuts the bottom side 70 of the outer surface of the hitch member 60. The upper surface 78 of each of the supports 72 has a coupling point 80 which is positioned adjacent to a respective one of the primary end 74 and the secondary end 76. Each of the supports 72 bends upwardly from the bottom side 70 of the outer surface 66 of the hitch member 60 such that the coupling point 80 on each of the supports 72 is coupled to the bottom edge 50 of a respective one of the first members 24 for attaching the hitch member 60 to the frame 22.

A plurality of hinges 82 is each coupled to and extends downwardly from the bottom edge 50 of a respective one of the first members 24 and each of the hinges 82 includes a first section 84 that is spaced from a second section 86. Each of the first section 84 and the second section 86 of each of the hinges 82 comprises a leg 88 extending along the bottom edge 50 of the respective first member 24 and a foot 90 extending downwardly from the leg 88. The first section 84 of each of the hinges 82 has a first hole 92 extending through the leg 88 of the first section 84. Continuing, the first section 84 of each of the hinges 82 has a second hole 93 extending through the foot 90 of the first section 84 and each of the hinges 82 is aligned with a respective one of four corners of the frame 22.

A plurality of support legs 94 is provided and each of the support legs 94 is pivotally attached to the cargo carrier 12. Each of the support legs 94 is positionable in a stored position when the cargo carrier 12 is attached to the vehicle 18. Each of the support legs 94 is positionable in a deployed position when the cargo carrier 12 is detached from the vehicle 18 thereby facilitating the support legs 94 to support the cargo carrier 12 above a support surface 96 such that the cargo carrier 12 defines a table 98. Each of the support legs 94 has an upper end 100 and a lower end 102, and the upper end 100 of each of the support legs 94 is positioned between the first section 84 and the second section 86 of a respective one of the hinges 82. Each of the support legs 94 is pivotally attached to the first section 84 and the second section 86 of the respective hinge 82 at a pivot point 104 that is located adjacent to the upper end 100.

The cargo carrier 12 includes a plurality of locks 106 that is each movably disposed in a lateral surface 108 of a respective one of the support legs 94 and each of the locks 106 is positioned adjacent to the pivot point 104 on the respective support leg 94. Each of the locks 106 is biased to extend outwardly from the lateral surface 108 of the respective support leg 94 and each of the locks 106 is urgeable inwardly on the lateral surface 108 of the respective support leg 94. Each of the locks 106 releasably engages the first hole 92 in the leg 88 of the first section 84 of the respective hinge 82 when the respective support leg 94 is positioned in the stored position having the respective support leg 94 resting against the bottom edge 50 of a respective one of the first members 24 of the frame 22. Conversely, each of the locks 106 releasably engages the second hole 93 in the foot 90 of the first section 84 of the respective hinge 82 when the respective support leg 94 is positioned in the deployed position having the respective support leg 94 extending downwardly from the bottom edge 50 of the respective first member 24 of the frame 22.

In use, the hitch member 60 is inserted into the hitch receiver 16 and each of the support legs 94 is moved into the stored position. In this way the cargo carrier 12 can function in the tradition manner of cargo carriers by supporting cargo for transporting the cargo. The hitch member 60 is removed from the hitch receiver 16 and each of the support legs 94 is positioned in the deployed position. In this way the cargo carrier 12 is converted into the table 98 thereby facilitating the table 98 to be employed at a picnic, for example, or other type of outdoor event. Furthermore, each of the handles 20 in the frame 22 facilitates the table 98 to be easily transported.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable cargo carrying assembly being convertible between a cargo carrier on a vehicle and a table, said assembly comprising:
  a cargo carrier having a hitch engagement such that said hitch engagement is attachable to a hitch receiver of a vehicle wherein said cargo carrier is configured to transport cargo, said cargo carrier having a pair of handles each being integrated into said cargo carrier thereby facilitating said cargo carrier to be carried by a user;
  a plurality of support legs, each of said support legs being pivotally attached to said cargo carrier, each of said support legs being positionable in a stored position when said cargo carrier is attached to the vehicle, each of said support legs being positionable in a deployed position when said cargo carrier is detached from the vehicle thereby facilitating said support legs to support said cargo carrier above a support surface such that said cargo carrier defines a table;
  wherein said cargo carrier comprises a frame having a pair of first members each extending between a pair of second members, said first members being oriented parallel with each other and being perpendicularly oriented with each of said second members such that said frame defines a rectangle, each of said second members having a first surface and a second surface, each of said first members having a primary surface and a secondary surface;
  wherein each of said second members has a slot extending through said first surface and said second surface such that said slot in each of said second members defines a respective one of said handles, said slot in each of said second members being centrally positioned between said pair of first members, said slot in each of said second members being elongated along an axis extending between said pair of first members; and
  wherein each of said first members has a plurality of holes extending through said primary surface and said secondary surface of a respective one of said first members, said holes being spaced apart from each other and being distributed along said respective first member; and
  wherein said cargo carrier includes a plurality of hinges, each of said hinges being coupled to and extending downwardly from said bottom edge of a respective one of said first members, each of said hinges including a first section being spaced from a second section, each of said first section and said second section of each of said hinges comprising a leg extending along said bottom edge of said respective first member and a foot extending downwardly from said leg, said first section of each of said hinges having a first hole extending through said leg of said first section, said first section of each of said hinges having a second hole extending through said foot of said first section, each of said hinges being aligned with a respective one of four corners of said frame.

2. The assembly according to claim 1, wherein said cargo carrier includes:
  a mesh panel having a perimeter edge, said perimeter edge having a plurality of intersecting sides such that said mesh panel has a rectangular shape, each of said intersecting sides being attached to said primary surface of a respective one of said first members and said first surface of a respective one of said second members such that said mesh panel defines a floor of said cargo carrier, said mesh panel being spaced upwardly from a bottom edge of each of said first members and a bottom edge of each of said second members; and
  a plurality of cross members, each of said cross members having a first end and a second end, each of said first end and said second end of each of said cross members being coupled to said primary surface of a respective one of said first members thereby inhibiting said first members from bending away from each other, each of said cross members being positioned beneath said mesh panel, said cross members being spaced apart from each other and being distributed along said pair of first members.

3. The assembly according to claim 1, wherein said cargo carrier includes a hitch member having a first end, a second end and an outer surface extending between said first end and said second end, said outer surface having a top side and a bottom side, said hitch member being attached to said frame such that said top side abuts said bottom edge of each of said first members of said frame thereby facilitating said hitch member to define said hitch engagement, said hitch member being oriented to extend along an axis being oriented parallel to said pair of second members of said frame, said hitch member being centrally positioned between said pair of second members, said first end being aligned with a respective one of said first members, said hitch member extending outwardly beyond a respective one of said first members such that said second end is insertable into the hitch receiver of the vehicle having said mesh panel lying on a horizontal plane.

4. The assembly according to claim 3, wherein said cargo carrier includes a pair of supports, each of said supports having a primary end, a secondary end and an upper surface extending between said primary end and said secondary end, said upper surface of each of said supports abutting said bottom side of said outer surface of said hitch member, said upper surface of each of said supports having a coupling point being positioned adjacent to a respective one of said primary end and said secondary end, each of said supports bending upwardly from said bottom side of said outer surface of said hitch member such that said coupling point on each of said supports is coupled to said bottom edge of a respective one of said first members for attaching said hitch member to said frame.

5. The assembly according to claim 1, wherein each of said support legs having an upper end and a lower end, said upper end of each of said support legs being positioned between said first second and said second section of a respective one of said hinges, each of said support legs being pivotally attached to said first section and said second section of said respective hinge at a pivot point being located adjacent to said upper end.

6. The assembly according to claim 5, further comprising a plurality of locks, each of said locks being movably disposed in a lateral surface of a respective one of said support legs, each of said locks being positioned adjacent to said pivot point on said respective support leg, each of said locks being biased to extend outwardly from said lateral surface of said respective support leg, each of said locks being urgeable inwardly on said lateral surface of said respective support leg, each of said locks releasably engaging said first hole in said leg of said first section of said respective hinge when said respective support leg is positioned in said stored position having said respective support leg resting against said bottom edge of a respective one of said first members of said frame, each of said locks releasably engaging said second hole in said foot of said first section of said respective hinge when said respective support leg is positioned in said deployed position having said respective support leg extending downwardly from said bottom edge of said respective first member of said frame.

7. A portable cargo carrying assembly being convertible between a cargo carrier on a vehicle and a table, said assembly comprising:
  a cargo carrier having a hitch engagement such that said hitch engagement is attachable to a hitch receiver of a vehicle wherein said cargo carrier is configured to transport cargo, said cargo carrier having a pair of handles each being integrated into said cargo carrier thereby facilitating said cargo carrier to be carried by a user, said cargo carrier comprising:
    a frame having a pair of first members each extending between a pair of second members, said first members being oriented parallel with each other and being perpendicularly oriented with each of said second members such that said frame defines a rectangle, each of said second members having a first surface and a second surface, each of said first members having a primary surface and a secondary surface, each of said second members having a slot extending through said first surface and said second surface such that said slot in each of said second members defines a respective one of said handles, said slot in each of said second members being centrally positioned between said pair of first members, said slot in each of said second members being elongated along an axis extending between said pair of first members, each of said first members having a plurality of holes extending through said primary surface and said secondary surface of a respective one of said first members, said holes being spaced apart from each other and being distributed along said respective first member;
    a mesh panel having a perimeter edge, said perimeter edge having a plurality of intersecting sides such that said mesh panel has a rectangular shape, each of said intersecting sides being attached to said primary surface of a respective one of said first members and said first surface of a respective one of said second members such that said mesh panel defines a floor of said cargo carrier, said mesh panel being spaced upwardly from a bottom edge of each of said first members and a bottom edge of each of said second members;
    a plurality of cross members, each of said cross members having a first end and a second end, each of said first end and said second end of each of said cross members being coupled to said primary surface of a respective one of said first members thereby inhibiting said first members from bending away from each other, each of said cross members being positioned beneath said mesh panel, said cross members being spaced apart from each other and being distributed along said pair of first members;
    a hitch member having a first end, a second end and an outer surface extending between said first end and said second end, said outer surface having a top side and a bottom side, said hitch member being attached to said frame such that said top side abuts said bottom edge of each of said first members of said frame thereby facilitating said hitch member to define said hitch engagement, said hitch member being oriented to extend along an axis being oriented parallel to said pair of second members of said frame, said hitch member being centrally positioned between said pair of second members, said first end of said hitch member being aligned with a respective one of said first members, said hitch member extending outwardly beyond a respective one of said first members such that said second end of said hitch member is insertable into the hitch receiver of the vehicle having said mesh panel lying on a horizontal plane;
    a pair of supports, each of said supports having a primary end, a secondary end and an upper surface extending between said primary end and said secondary end, said upper surface of each of said supports abutting said bottom side of said outer surface of said hitch member, said upper surface of each of said supports having a coupling point being positioned adjacent to a respective one of said primary end and said secondary end, each of said supports bending upwardly from said bottom side of said outer surface of said hitch member such that said coupling point on each of said supports is coupled to said bottom edge of a respective one of said first members for attaching said hitch member to said frame; and
    a plurality of hinges, each of said hinges being coupled to and extending downwardly from said bottom edge of a respective one of said first members, each of said hinges including a first section being spaced from a second section, each of said first section and said second section of each of said hinges comprising a leg extending along said bottom edge of said respective first member and a foot extending downwardly from said leg, said first section of each of said hinges having a first hole extending through said leg of said first section, said first section of each of said hinges having a second hole extending through said foot of said first section, each of said hinges being aligned with a respective one of four corners of said frame;

a plurality of support legs, each of said support legs being pivotally attached to said cargo carrier, each of said support legs being positionable in a stored position when said cargo carrier is attached to the vehicle, each of said support legs being positionable in a deployed position when said cargo carrier is detached from the vehicle thereby facilitating said support legs to support said cargo carrier above a support surface such that said cargo carrier defines a table, each of said support legs having an upper end and a lower end, said upper end of each of said support legs being positioned between said first second and said second section of a respective one of said hinges, each of said support legs being pivotally attached to said first section and said second section of said respective hinge at a pivot point being located adjacent to said upper end; and a plurality of locks, each of said locks being movably disposed in a lateral surface of a respective one of said support legs, each of said locks being positioned adjacent to said pivot point on said respective support leg, each of said locks being biased to extend outwardly from said lateral surface of said respective support leg, each of said locks being urgeable inwardly on said lateral surface of said respective support leg, each of said locks releasably engaging said first hole in said leg of said first section of said respective hinge when said respective support leg is positioned in said stored position having said respective support leg resting against said bottom edge of a respective one of said first members of said frame, each of said locks releasably engaging said second hole in said foot of said first section of said respective hinge when said respective support leg is positioned in said deployed position having said respective support leg extending downwardly from said bottom edge of said respective first member of said frame.

\* \* \* \* \*